United States Patent [19]
Peck et al.

[11] Patent Number: 5,111,098
[45] Date of Patent: May 5, 1992

[54] UNITARY ROTATIONAL SPEED SENSOR

[75] Inventors: David E. Peck; George E. Platzer, both of Rochester Hills; Dennis A. Kramer; William D. Krusel, both of Troy, all of Mich.

[73] Assignee: Rockwell International Corporation, Pittsburgh, Pa.

[21] Appl. No.: 463,736

[22] Filed: Jan. 12, 1990

Related U.S. Application Data

[63] Continuation-in-part of Ser. No. 236,689, Aug. 24, 1988, abandoned.

[51] Int. Cl.$^5$ .............. H02K 1/22; H02K 11/00; H02K 17/42; G01P 3/48
[52] U.S. Cl. .................. 310/268; 310/168; 310/156; 310/68 B; 324/174
[58] Field of Search ............. 310/67 R, 68 B, 75 C, 310/156, 168, 169, 171, 181, 114, 268; 361/236, 238, 240, 243, 245; 324/173, 174

[56] References Cited

U.S. PATENT DOCUMENTS

| | | | |
|---|---|---|---|
| 2,567,422 | 9/1951 | Camp | 310/268 |
| 3,181,020 | 4/1965 | Welter | 310/164 |
| 3,230,406 | 1/1966 | Baudot | 310/155 |
| 3,230,407 | 1/1966 | Marsh | 310/168 |
| 3,480,812 | 11/1969 | Hershberger | 310/168 |
| 3,489,935 | 1/1970 | Hayes | 310/168 |
| 3,515,920 | 6/1970 | Jones | 310/168 |
| 3,551,712 | 12/1970 | Jones | 310/168 |
| 3,626,226 | 12/1971 | Pauwels | 310/168 |
| 3,646,376 | 2/1972 | Anderson | 310/156 |
| 3,649,859 | 3/1972 | Watt et al. | 310/168 |
| 3,652,887 | 3/1972 | Taubitz et al. | 310/168 |
| 3,710,158 | 1/1973 | Bachle et al. | 310/156 |
| 3,745,392 | 7/1973 | Phoenix et al. | 310/168 |
| 3,772,549 | 11/1973 | Cumming | 310/168 |
| 3,782,136 | 1/1974 | Ploppa et al. | 310/168 |
| 3,812,391 | 5/1974 | Johnson et al. | 310/168 |
| 3,854,556 | 12/1974 | Gee | 310/156 |
| 4,061,938 | 12/1977 | Hashimoto et al. | 310/168 |
| 4,171,495 | 10/1979 | McNinch, Jr. | 310/168 |
| 4,536,672 | 8/1985 | Kanayama et al. | 310/268 |
| 4,639,626 | 1/1987 | McGee | 310/168 |

Primary Examiner—Steven L. Stephan
Assistant Examiner—C. LaBalle

[57] ABSTRACT

Four embodiments of a reluctance type rotational speed sensor are disclosed. In the first embodiment, an annular magnet circumscribes a sensing coil having a unitary rotor nested within it, and is disposed between two elements which comprise the stator. In a second embodiment, a magnet is disposed between two halves which comprise a rotor, the entire assembly nesting within a sensing coil and being disposed between the two stator elements. In the third embodiment, the rotor carries multiple magnets in an axially opposed position with respect to teeth formed on the stator. The magnetic flux in the magnetic circuit increases and decreases as the rotor magnets alternate between aligned and non-aligned positions enabling measurement of angular speed in accordance with the increase and decrease of magnetic flux. Any of the first three embodiments may be used, with minor modifications, in environments where a rotating shaft turns within a stationary bore, or where a rotting bore turns about a stationary shaft. The fourth embodiment incorporates the features of the first three and further includes a caliper-like stator and coil assembly which may be removed for service without requiring extensive disassembly.

53 Claims, 9 Drawing Sheets

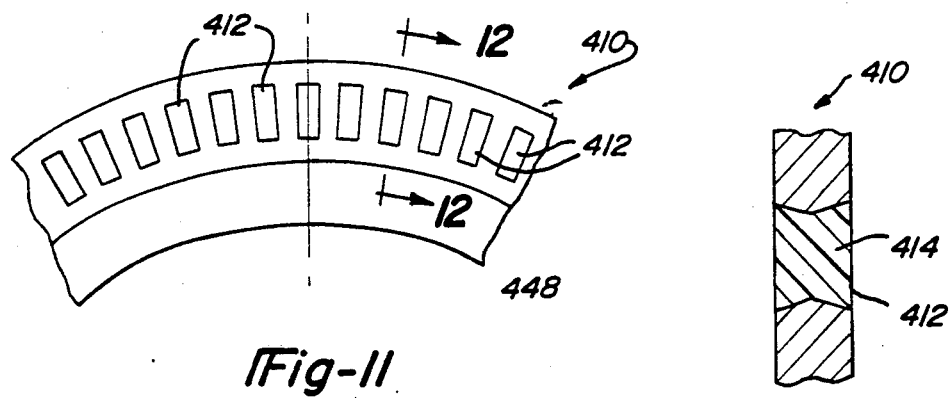
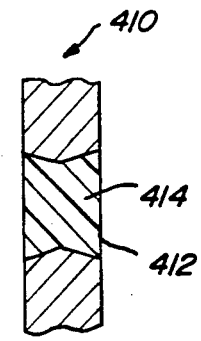
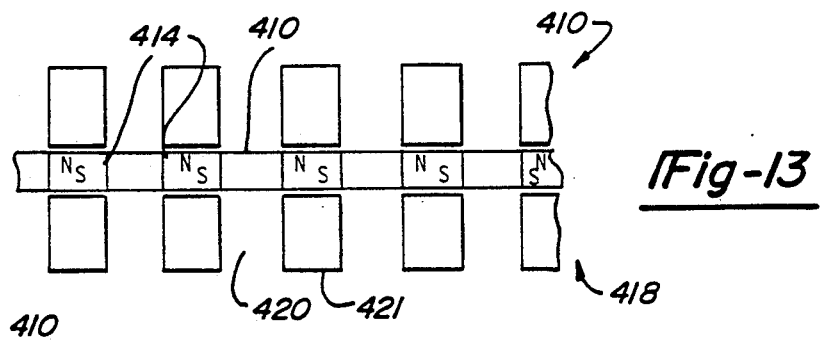
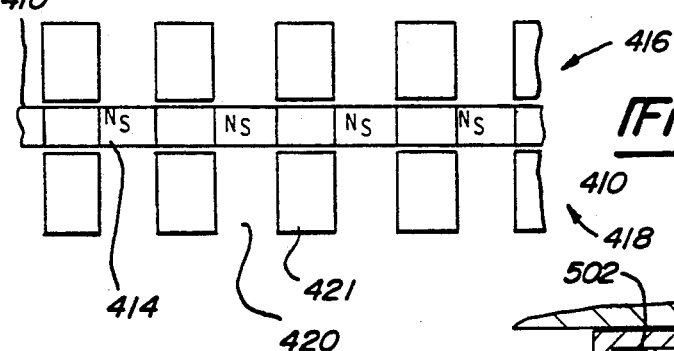
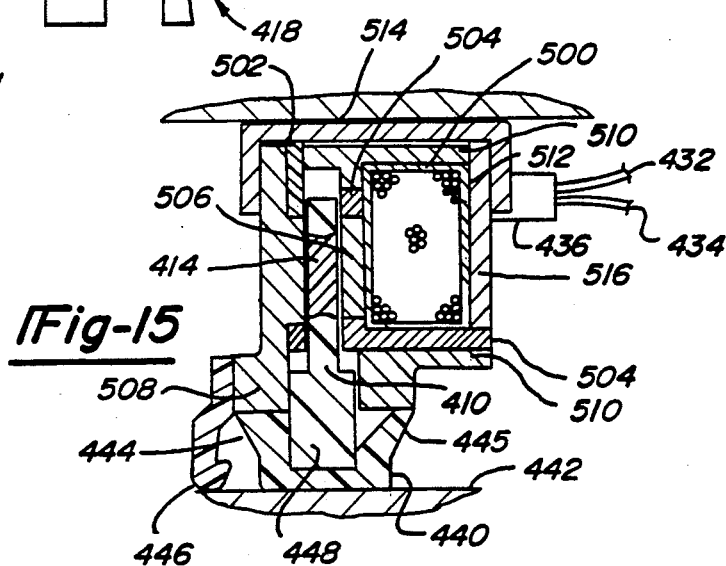

UNITARY ROTATIONAL SPEED SENSOR

BACKGROUND OF THE INVENTION

This application is a continuation-in-part of application Ser. No. 07/236,689, filed Aug. 24, 1988, now abandoned.

FIELD OF THE INVENTION

This invention relates generally to rotational speed sensors, and more particularly to compact, unitary rotational speed sensors.

DESCRIPTION OF THE RELATED ART

Rotational speed sensors are used in many control and indicating systems. One frequently used type employs the variable reluctance principle. Common problems in such sensors in the prior art include constructing a device which will fit into compact spaces while maintaining close control over rotor-stator spacing, and providing sufficient output signal in terms of both signal amplitude and number of pulses per revolution.

Prior art devices known to the inventors include those disclosed in U.S. Pat. Nos. 2,462,761 to Momberg; 3,480,812 to Hershberger; 3,596,122 to Stewart; 3,604,966 to Liggett; 3,649,859 to Watt; 4,027,753 to Lantz; and 4,110,647 to Eslinger et al. In particular, the Hershberger device shows a nesting arrangement of rotor, magnet, coil and stator elements. Watt discloses a reluctance-type rotational speed sensor utilizing radially extending teeth on both stator and rotor. The Lantz device comprises a sealed system. None of the above-mentioned devises, however, combine the various teachings of the present invention to obtain a significantly more compact design that is capable of greater output levels, and versatile enough for use in many environments.

SUMMARY OF THE INVENTION

The present rotational speed sensor improves upon prior art speed sensors by utilizing an axially compact design to obtain accurate measurements in a variety of environments. The flat, generally circular shape allows the sensor to measure the rotational speed of either a rotating shaft or a rotating bore. The sensor is designed to minimize the effects of eccentricities and unwanted relative movement between sensor components. For example, both radial runout and axial runout have minimal effect on the output of the sensor. Furthermore, the particular design of the magnetic circuit used by this sensor enables it to generate a high output signal for its size.

The present speed sensor includes a rotor and a stator, each having teeth defining slots which act in conjunction with an annular magnet to increase and decrease magnetic flux in a magnetic circuit. The changes in flux generated by the rotor system induce alternating voltage in a coil of wire in a well known manner to produce signals representative of rotational speed.

The first embodiment includes a coaxially nested rotor, annular magnet and circumscribing coil sandwiched between a pair of stator elements. The second embodiment includes a rotor comprising two halves with a magnet disposed therebetween. In the third embodiment, the rotor carries circumferentially spaced magnets in an axially opposed position with respect to teeth formed on the stator. Any of the first three embodiments may be used, with minor modifications, in environments where a rotating shaft turns within a stationary bore, or where a rotating bore turns about a stationary shaft.

The fourth embodiment incorporates the features of the first three and further includes a caliper-like stator and coil assembly which may be removed for service without requiring extensive disassembly.

BRIEF DESCRIPTION OF THE DRAWINGS

FIG. 11 is a plan view of the rotor of the sensor used in the third embodiment;

FIG. 12 is a sectional view of the rotor taken along the lines 12—12 in FIG. 11;

FIG. 13 is a developed sectional view of the rotor and stator of the sensor taken with the rotor and stator in a first position;

FIG. 14 is a developed sectional view of the rotor and stator of the sensor taken with the rotor and stator in a second position;

FIG. 15 is a sectional view of the sensor according to a modification of the third embodiment;

DESCRIPTION OF THE PREFERRED EMBODIMENTS

Figure 1:
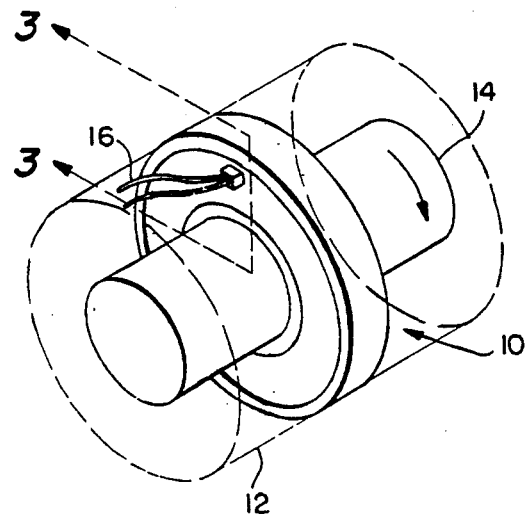
FIG. 1 is a perspective view of one embodiment of the present speed sensor, showing the sensor mounted in a stationary bore and driven by a rotating shaft.
Figure 2:
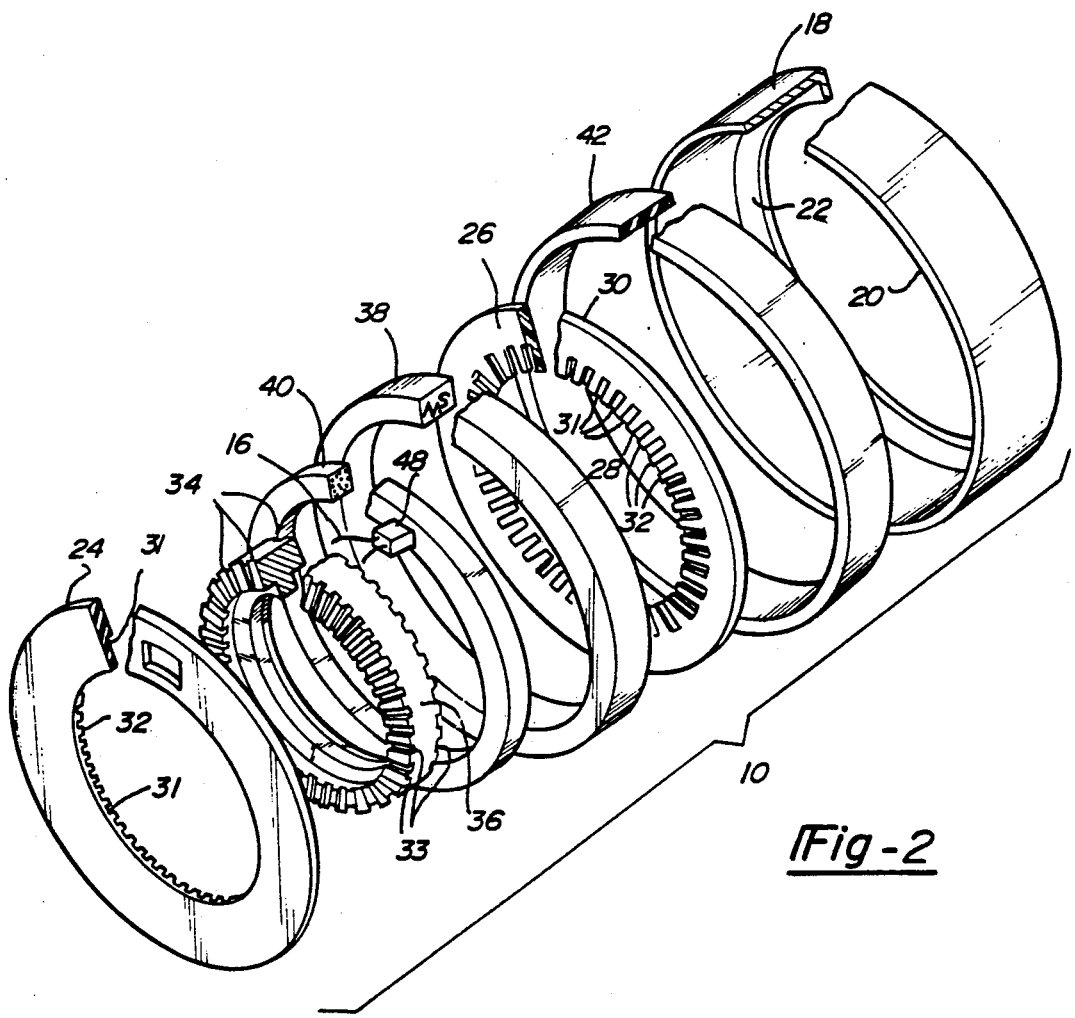
FIG. 2 is an exploded view of the components of the sensor of FIG. 1.

A preferably annular rotational speed sensor constructed according to the teachings of the present invention is indicated generally at 1 in FIG. 1. The sensor is mounted in stationary bore 12, and is driven by rotating shaft 14. Electrical leads 16 come from an internal sensing coil. FIG. 2 is an exploded view of the basic components employed in one exemplary embodiment of speed sensor 10. As shown in FIG. 2, the components of the first embodiment telescope into sensor retainer 18 from the left. Edge 20 is rolled over to cooperate with lip 22 in retaining the sensor components within retainer 18. The double-lipped design shown in FIG. 2 is merely one example of suitable retaining means that could be used with the present embodiment. A variety of other retaining means can be used, including adhesives. Annular stator elements 24 and 26 provide magnetic communication between the first radial portion 28 and second radial portion 30. Circumferentially spaced, radially disposed teeth 32 and slots 31 are formed on the inner faces of stator elements 24 and 26, and act in conjunction with corresponding teeth 34 and slots 33 formed in rotor 36 to provide the means for sensing rotational speed. The slots may be produced by forming teeth on the blank used to produce the stator elements and the rotor; or in the alternative, the slots may be formed by piercing openings in the respective blanks. Pierced openings offer a low magnetic permeability path to the flow of magnetic flux; whereas, the material between the pierced openings offers a high magnetic permeability path. The objective in either case is to provide a rotor and stator element which has respective radial portions which feature alternating circumferentially spaced regions offering first and second magnitudes of magnetic permeability. Axially poled annular magnet 38 provides magnetic flux for sensor 10. A sensing coil, shown encapsulated at 40, consists of a simple multi-turn winding oriented so that its axis is coincident with the linear axis of the assembled sensor. Other means for sensing variations in magnetic flux in the magnetic flux path may be used. (i.e., HALL sensors). Lead wires 16 extend from the two ends of coil 40 to connect the alternating voltage representing rotational speed signals to an external signal processing unit (not shown).

In this first exemplary embodiment, rotor 36 is rotationally driven by a shaft. Both rotor 36 and stator elements 24 and 26 have an equal number of radially disposed teeth and slots. The radial length of the rotor teeth 34 is preferably slightly less than the length of the stator teeth 32. In addition, rotor teeth 34 are positioned relative to the stator teeth 32 in such a way that the rotor teeth 34 lie within the length of the stator teeth 32. By this design, signal losses due to magnetic shunting and radial runout are reduced. Rotor 36 nests within coil 40, and the rotor-coil combination nests coaxially within magnet 38. This assembly in turn is located coaxially with and sandwiched between stator elements 24 and 26.

Figure 3:
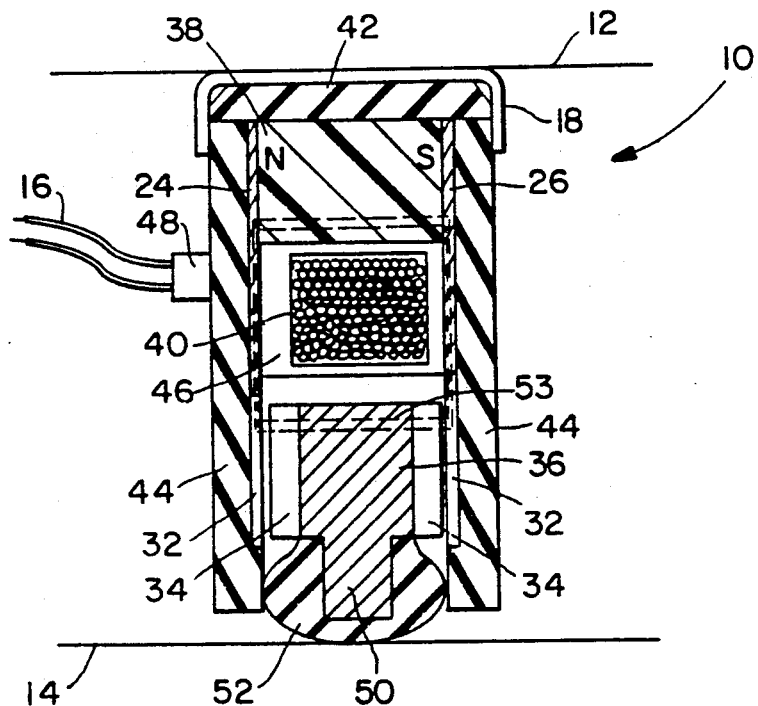
FIG. 3 is a sectional view taken along the lines III—III in FIG. 1.

FIG. 3 is a sectional view of the sensor shown in FIG. 1 taken along lines 3—3 and looking in the direction of the arrows. In this view, the nesting relationship of rotor 36, coil 40 and magnet 38 is shown. Stator elements 24 and 26 are relatively thin members, made of, for example, 22 gauge steel. In the design shown, the stator elements 24 and 26 are backed by a layer of a non-magnetic material such as injection-molded plastic, as indicated at 44. Cooperating lips of retainer 18 may be used to retain the sensor components therein. This particular cross section of the stator elements 24 and 26 shows a slot at 31 in each stator element. Teeth and slots in the stator elements may be formed by a variety of methods including stamping or etching. In the final construction, slots 31 are preferably filled with backing material 44. Filling the slots results in a smooth continuous surface presented by the inner face of each stator element, so that if the rotor 36 contacts stator elements 24 and 26 no damage will occur. The stator elements 24 and 26 must be positioned relative to each other so that teeth and slots are in axial alignment.

Coil 40 is shown encapsulated by bobbin 46. Connections to the ends of coil 40 are made by lead wires 16, which exit through strain relief 48 on bobbin 46. Stator elements 24 and backing material 44 are provided with an opening to allow strain relief 48 to pass.

Rotor 36 is slightly thinner than the space between the stator elements 24 and 26 to provide axial running clearance, and the outer diameter of rotor 36 is less than the inner diameter of coil 40 to provide sufficient radial clearance to account for eccentricity and dimensional tolerances.

Several techniques can be used to fabricate rotor 36 including sintering powdered iron. Rotor 36 may be a one-piece element, or may comprise two halves oriented with outwardly-facing teeth to operate in the same manner as the one-piece rotor. The rotor is preferably encapsulated in plastic or other suitable material (for example, backing material 44) such that slots 33 are filled flush thus forming a unitary element regardless of one or two-piece design.

Hub 50, shown on the inside diameter of rotor 36, retains elastomeric ring 52. Ring 52 serves four functions. First, it provides a friction drive connection between shaft 14 and hub 50 of rotor 36. Second, it provides vibration isolation of the rotor relative to its driving member. Third, the area of contact between stator elements 24, 26 and ring 52 provides a running seal to keep contaminants out of the relatively moving parts of sensor 10. Fourth, compression of the ring at the stator element sealing surface provides a centering force for rotor 36, tending to keep the rotor from contacting the stator elements 24 and 26.

Friction drive of the rotor via ring 52 is the preferred drive means for the rotational speed sensor; other drive means, however, including tangs or keys engaging slots on the rotating shaft, could also be used.

A toroidal magnetic flux path 53 is thus established around coil 40 and proceeds axially from one face of magnet 38 to one adjacent stator element, radially through the stator element, axially into and out of rotor 36 into the other stator element, and finally radially through this second stator element and back into magnet 38. As rotor 36 rotates, the rotor and stator teeth 32 and 34 move into and out of juxtaposition to alternately decrease and increase the magnetic reluctance of the magnetic path. The change in reluctance increases and decreases the magnetic flux in the magnetic path. This change in flux generates a voltage in coil 40 in accordance with known principles. The output voltage on leads 16 will be an alternating voltage with an amplitude proportional to the speed of rotation, and a frequency equal to the speed of rotation times the number of teeth in 360°.

The FIG. 3 embodiment requires retainer 18 to be non-magnetic to avoid shunting of magnetic flux. Furthermore, if bore 12 is ferromagnetic, a spacer 42 must be included to avoid shunting by the bore.

Figure 4:
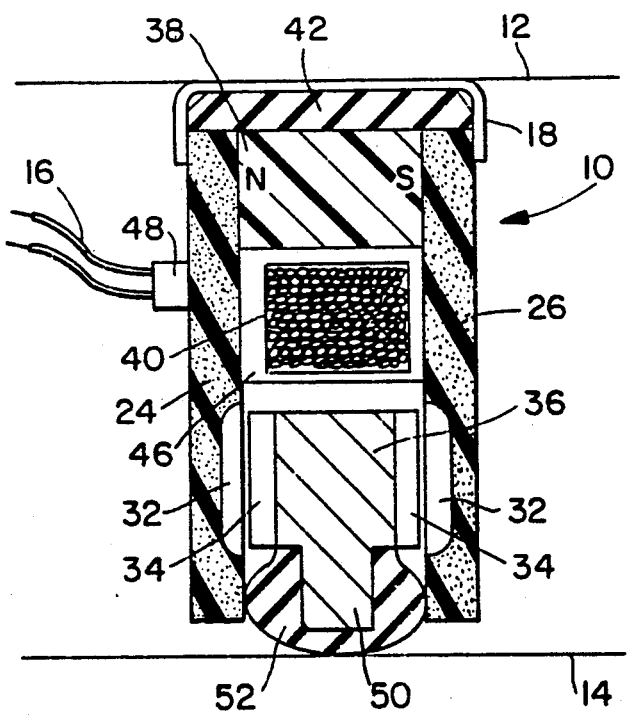
FIG. 4 is a sectional view of the sensor shown in FIG. 3 but having an alternate stator construction.

FIG. 4 shows the sensor cross section of FIG. 3, but with stator elements 24 and 26 composed of a composite material rather than a metal plate backed by a non-metal material. Stator elements 24 and 26 may, for example, be molded from a plastic or nylon having iron powder dispersed to a density such that its permeability is sufficient to provide an adequate magnetic path. The advantages of this method of construction include better dimensional control of components and lower cost due to simpler processing. Slots 31 and 33 in stator elements 24 and 26 and rotor 36 may be filled with nonmagnetic material as before to prevent damage due to rubbing.

Figure 5:
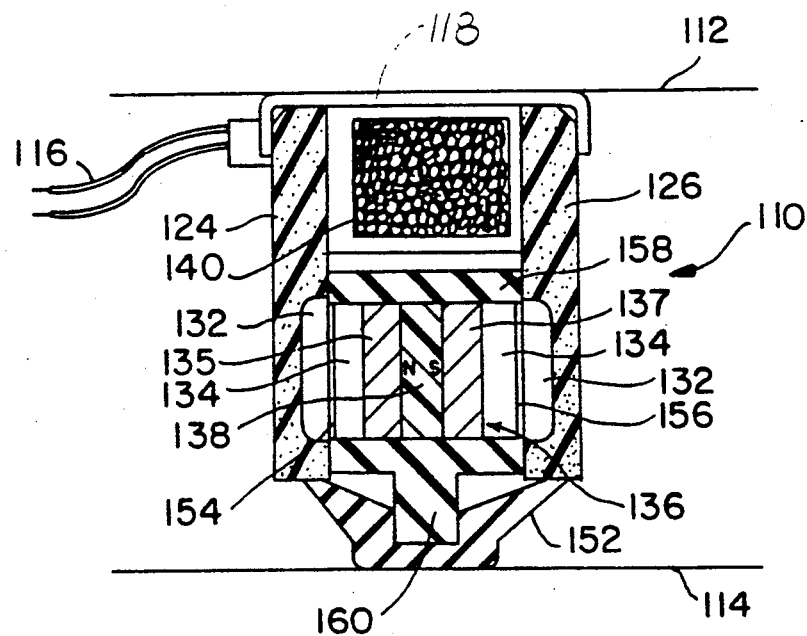
FIG. 5 is a sectional view of the sensor according to a second disclosed embodiment.
Figure 6:
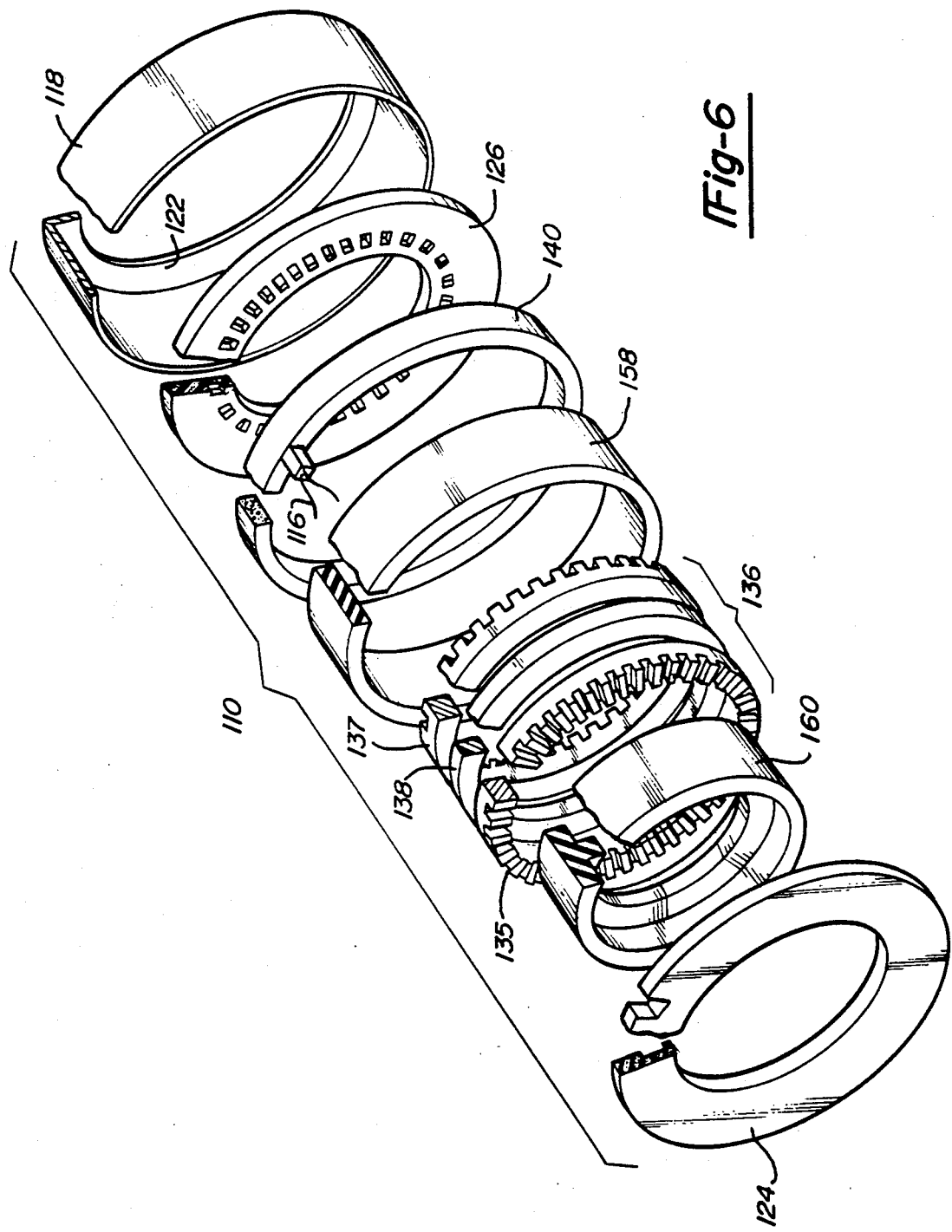
FIG. 6 is an exploded view of the components of the sensor shown in FIG. 5.

FIG. 5 shows a second embodiment of a rotational speed sensor. With reference to both FIG. 5 and FIG. 6, rotor 136 is shown split into two halves, sandwiching magnet 138. Magnet 138 has inner and outer diameters approximately equal to those of the rotor halves 135 and 137 so that the rotor-magnet assembly nests within coil 140 and between stator elements 124 and 126. Coil 140 may be adhesively or otherwise fastened to stator elements 124 and 126. As long as the thickness of magnet 138 is appreciably greater than the combined air gaps shown at 154 and 156, the operating point on the demagnetization curve of magnet 138 will be high enough to provide an adequate change in flux to produce a sufficient voltage from coil 140. Magnet 138, is preferably as thin as is operationally practical. This embodiment has the advantages of reducing axial space requirements, decreasing the cost of magnet 138 and eliminating the shunting effect present when the sensor is placed in a ferrous bore.

Rotor 136 is constructed to maintain a minimum rotor-stator clearance. In an exemplary construction, the two ferromagnetic rotor halves 135 and 137 are indexed and placed in a injection molding cavity with magnet 138 between them. Rotor rims 158 and 160 are then molded around rotor halves 135, 137 and magnet 138.

The molding cavity is constructed so that air gaps 154 and 156 are created. These gaps are on the order of 0.005 inches. By relocating magnet 138 between rotor halves 135 and 137, the flux path now proceeds from magnet 138 across one air gap, radially through the adjacent stator element, then axially through retainer 118, down radially through the other stator element, and back to magnet 138.

Rotor rims 158 and 160 are shown abutting stator element 124 with running clearance from stator element 126. Rotor rims 158 and 160 may run in contact with either stator element or float between the stator elements, but are always in preventive contact with rotor 136. Although shown as rims, rotor rims 158 and 160 may be any suitable spacer means for maintaining rotor-stator spacing. A sine wave output from coil 140 is achieved with no anomalies when a clearance of a few thousandths of an inch is maintained between rotor and stator teeth 134 and 132.

Since rotor rims 158 and 160 act as bearing surfaces running against stator elements 124 and 126, the composition of rims 158 and 160 must be compatible with the stator material to minimize wear. For example, if steel stator elements are used, nylon or nylon with a low-friction additive would be satisfactory. If iron-filled composite is used for the stator elements (as shown in FIG. 5), the stator matrix would preferably be polyethersulphone working against nylon rims. As a further method of reducing friction, sensor 110 may be filled with grease or oil, with lubrication lands put in the rim area facing the stator elements. Depending upon wear characteristics, a single rotor rim may be used instead of two.

The elastomeric ring 152, which forms the seal for this second embodiment, performs essentially the same functions as elastomeric ring 52 from the first embodiment, but is located differently on the second embodiment sensor. As shown in FIG. 5, ring 152 extends along both the extension of rim 160 and stator elements 124 and 126, but does so without the cavity formed between the two stator elements. As such, elastomeric ring 152 acts as a low-friction axial seal instead of as a radial seal.

Figure 7:
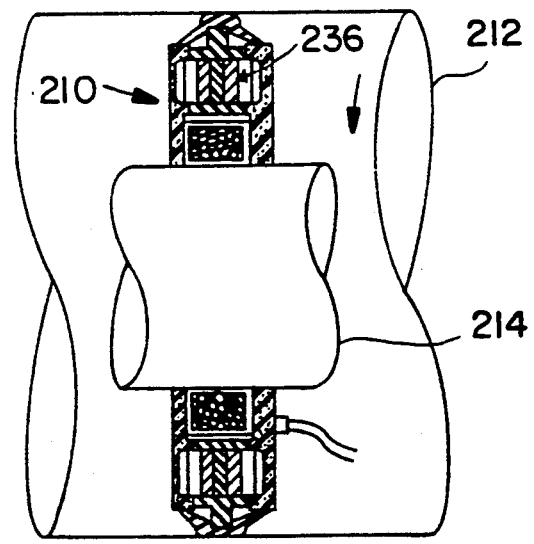
FIG. 7 shows that subject sensor in an alternate configuration suitable for measuring the speed of a rotating bore.

All of the configurations discussed thus far are designed for speed sensing of a rotating shaft within a stationary bore. The present speed sensor may be modified to also satisfy requirements where the shaft is stationary and the bore rotates. FIG. 7 shows a sensor 210 mounted on a stationary shaft 214 with rotor 236 being driven by a rotating bore 212. The arrangement shown in FIG. 7 functions in essentially the same manner as the arrangement of FIG. 5, but with the radial positioning of elastomeric ring 152, rotor 136, and coil 140 reversed. FIG. 7 shows shaft 214 being used to close the flux path. It must, therefore, have a composition capable of providing a magnetic flux path. As in the FIG. 5 configuration, the stator elements may be fastened to the coil using adhesive.

As mentioned previously, friction drive of the rotor via the elastomeric ring is the preferred drive means for the rotational speed sensor. Friction drive makes assembly easy, and it eliminates alignment problems associated with locking the rotor to a driving element. Tang drive is possible, but requires extremely close tolerances to avoid backlash, which could give erroneous speed signals.

Figure 8:
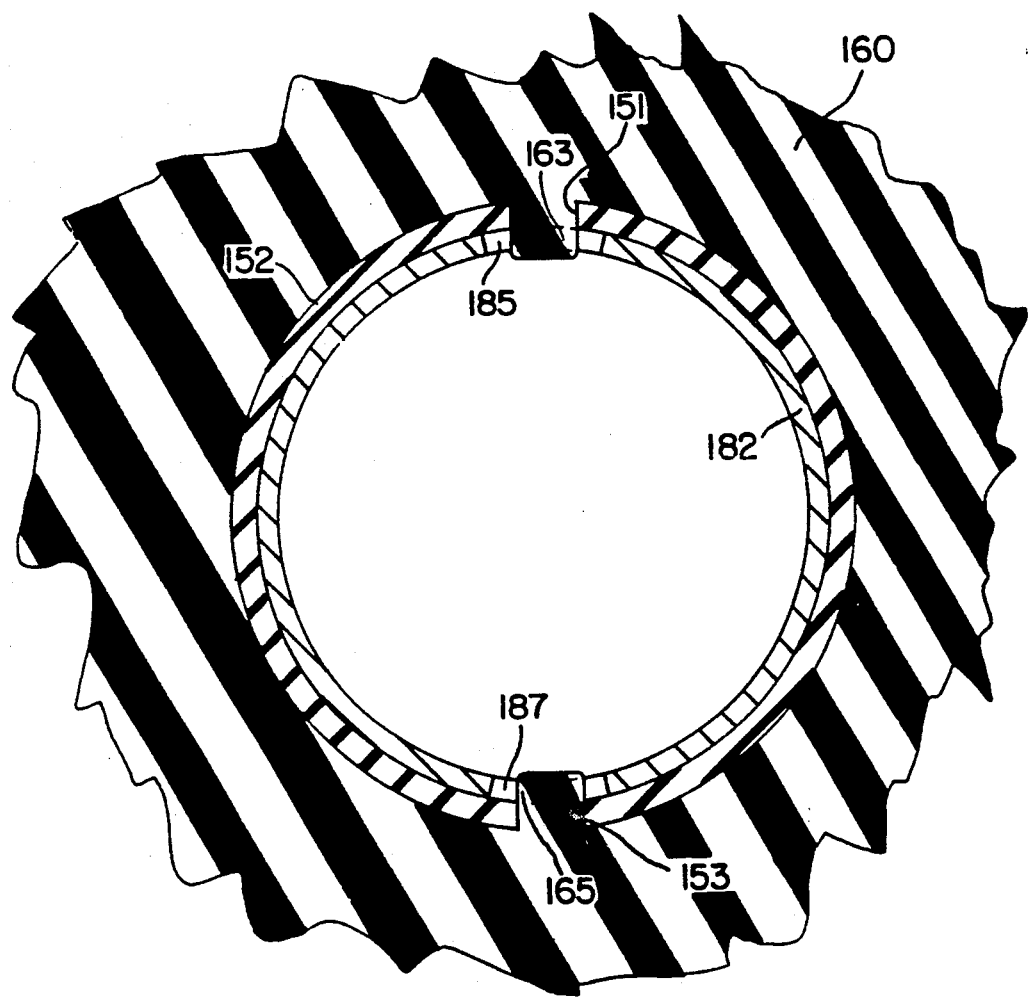
FIG. 8 is a sectional view of a modification of the arrangement shown in FIG. 3.

Tang drive would be required, however, in certain circumstances where high drive torque might overcome the frictional force of a friction drive means. In such a circumstance, a combination of friction drive and tang drive is preferred. FIG. 8 shows a partial sectional view through the center of a modified speed sensor mounted as in the FIG. 5 embodiment, but incorporating a combined friction and tang drive. Rotor rim 160 includes tangs 163 and 165, which protrude through slots 151 and 153 in elastomeric ring 152. Slots 151 and 153 are axially located in the center of ring 152 so as to maintain the integrity of ring 152. Drive member 182 has slots 185 and 187 formed in it to accept tangs 163 and 165. Slots 185 and 187 may be formed wider than the tangs for ease of assembly. Tang drive in the FIG. 8 arrangement is a backup drive means to the preferred friction drive. Normal rotation is accomplished by the frictional force between elastomeric ring 152 and drive member 182. When the torque requirement exceeds the frictional capabilities, however, tangs 163 and 165 are engaged via slots 185 and 187 to drive the rotor.

Figure 9:
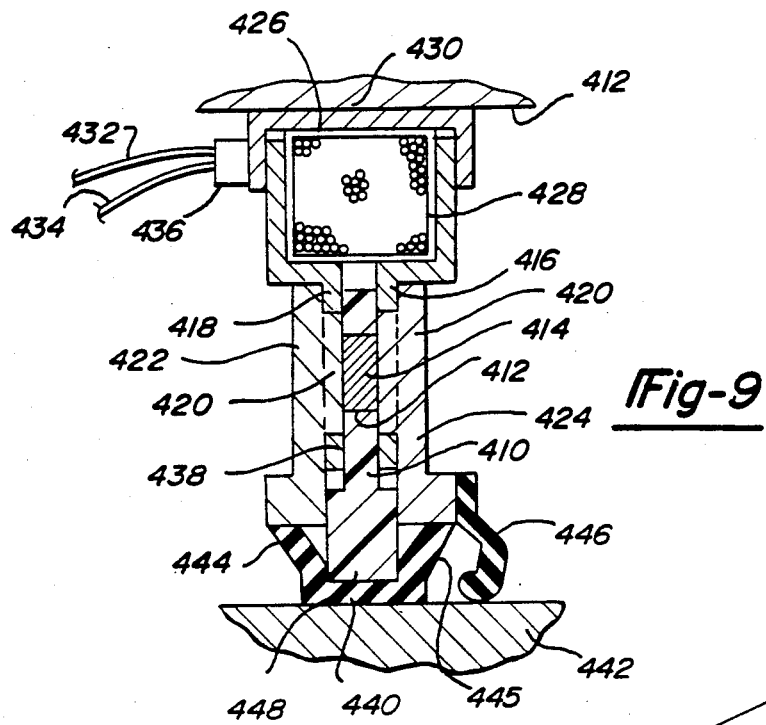
FIG. 9 is a sectional view of the sensor according to a third embodiment.
Figure 10:
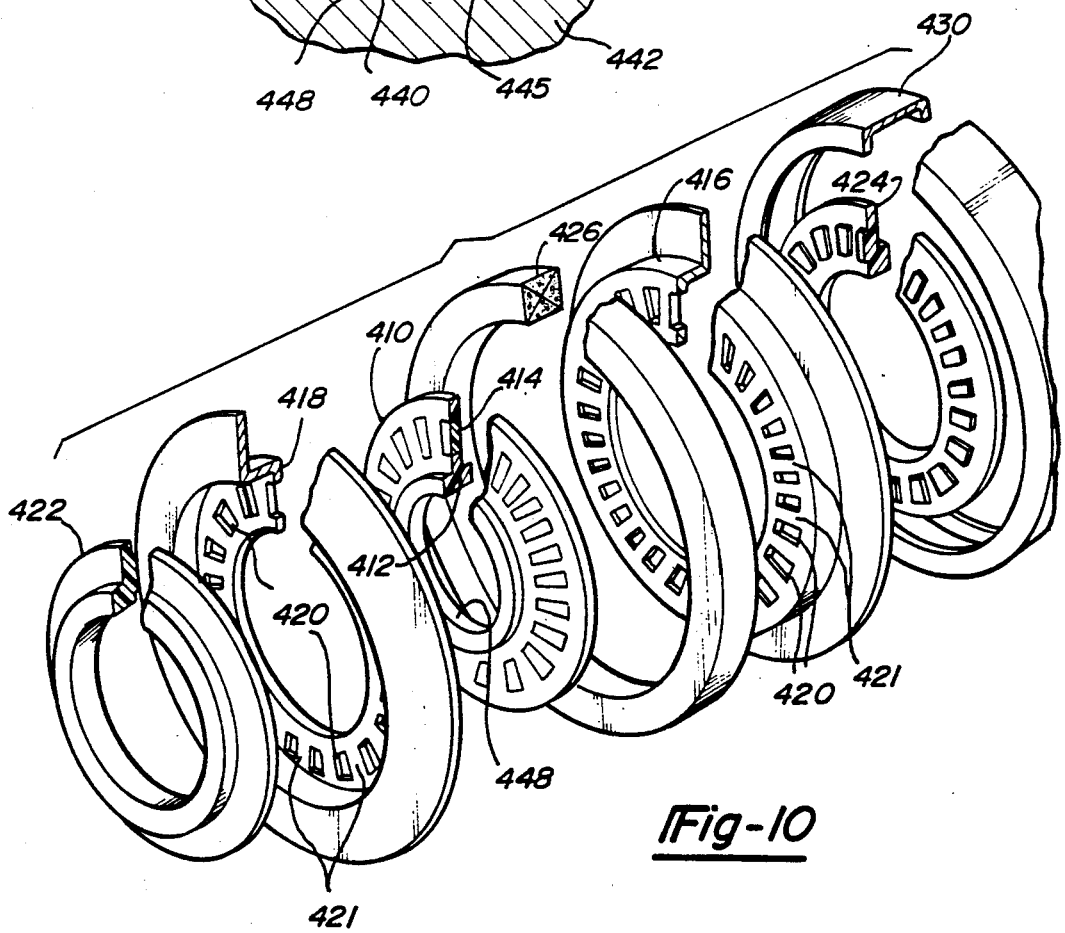
FIG. 10 is an exploded view of the components of the sensor shown in FIG. 9.

FIG. 9 shows a third embodiment of the rotational speed sensor of the present invention. With reference to both FIG. 9 and FIG. 10, rotor 410 is shown having several axially extending passageways 412 circumferentially spaced about the rotor. The passageways define openings on each opposing rotor surface. Magnets 414 are retained in the passageways by use of an adhesive or by mechanical interlock. Magnets 414 are aligned so as to offer common pole faces oriented toward opposing rotor surfaces. The rotor 410 is constructed from a low magnetic permeability material such as nylon.

Stator elements 416 and 418 are relatively thin members constructed from a high magnetic permeability material having slots 420. Slots 420 may be formed by piercing holes in the stator structure or by forming teeth which project from the stator structure itself. In either manner, the stator elements offer radial portions having alternating circumferentially spaced regions having first and second magnitudes of magnetic permeability. The magnets on the rotor provide a magnetic flux source and are arranged to produce a variable magnetic flux in a flux path formed around the coil 426. Coil 426 provides a means for sensing variations in magnetic flux in said flux path. The slots 420 are preferably filled with low magnetic permeability material to provide a relatively flat stator surface.

The radial length of the magnets 414 is shorter than the radial length of the stator slots 420 to avoid magnetic shunting of the magnets. In addition, the circumferential width of the magnets 414 is preferably approximately the circumferential width of the stator slots 420 to permit the magnets to move into positions in which the magnetic flux path offers alternating high or low magnetic reluctance.

The plastic overmolds 422 and 424 are molded and secured to the stator elements by injection molding the overmolds with the stator elements 416 and 418 incorporated in an injection molding die as inserts. During the injection molding process, plastic flows to fill the slots formed in the stator elements to form an intimately bonded structure. The stator elements 416 and 418 and the overmolds 422 and 424 are mirror images of one another permitting manufacture using the same process equipment.

The stator elements 416 and 418 have flanged portions which form a cavity for receiving wire coil 426. Wire coil 426 is preferably 1300 turns of No. 39 enameled wire wound and encapsulated in bobbin 428. Retainer 430 is constructed of high magnetic permeability material and serves to maintain structural connection of the stator elements as well as establish magnetic communication therebetween. Lead wires 432 and 434 are connected to the wire coil 426 and pass through the retainer 430 and stator element 418 via strain relief 436. The air gap 438 between rotor 410 and stator elements 416 and 418 is maintained by the clamping action of retainer 430 maintaining the stator elements 416 and 418 against opposing face portions of bobbin 428.

In operation, the inner most radial portions of the plastic overmold 422 and 424 may contact the hub portion 448 of rotor 410. If this occurs, very little wear will be experienced as the rotor 410 is preferably constructed from nylon filled with long fiber aramid and the plastic overmolds 422 and 424 are preferably constructed from PPS having 10% glass and 5% Teflon.

A toroidal magnetic flux path is established around the coil 426 proceeding from one pole face of magnets 414 passing through the teeth of the stator element 416 radially through the stator element, axially through the retainer 430 into stator element 418 radially therethrough into the respective stator teeth and finally to the opposing pole face of magnet 414.

As the rotor rotates, the rotor magnets 414 move into and out of alignment with stator teeth 421 to alternately decrease and increase the magnetic flux flowing in the flux path. The change in magnitude of magnetic flux in the magnetic flux path generates a voltage in coil 426 in accordance with known principles. The relationship between the magnets 414 and the stator slots 420 is shown in FIG. 13 and FIG. 14. FIG. 13 illustrates the stator elements 416 and 418 having teeth 421 in aligned positions with respect to magnets 414 of rotor 410.

FIG. 14 illustrates the same components wherein the rotor 410 has moved to a non-aligned position. In the preferred construction of this embodiment 100 magnets are used and each stator element has 100 slots. The output voltage across leads 432 and 434 shown in FIG. 9 will be an alternating voltage with an amplitude proportional to the speed of rotation and a frequency equal to the speed of rotation times the number of teeth encountered in one revolution.

The elastomeric ring 440 as shown in FIG. 9 provides a compliant force frictionally engaging driving shaft 442. In addition, ring 440 provides vibration isolation of the rotor relative to shaft 442. Finally, the ring 440 includes two lip portions 444 and 445 which contact plastic overmolds 422 and 424 respectively to provide a seal to keep contaminants out of the moving parts of the sensor. Friction drive of the rotor via ring 440 is the preferred drive means for the sensor; other means however, including tangs or keys engaging slots on the rotating shaft could also be used. A supplemental seal 446 may be used on either or both sides of the sensor to supplement the sealing action of lip portions 444 and 445.

FIG. 11 is a plan view of the rotor 410 illustrating the axially extending passageways 412 and rotor hub 448. FIG. 12 is a sectional view of rotor 410 taken along the lines 12—12 in FIG. 11 showing passageway 412 having a first opening on a first radially extending surface of rotor 410 and a second opening on a second radially extending surface and a portion of the passageway intermediate the openings having a smaller radial dimension so as to mechanically interlock magnet 414 formed in the passageway.

The third embodiment as illustrated in FIG. 9 features a coil 426 radially spaced from the rotor 410 whereby the coil and rotor provide a minimal axial package size. A variation of this embodiment, as shown in FIG. 15, features a coil 500 axially spaced from rotor 410 whereby the coil 500 and rotor 410 provide a minimal radial package size. The variation requires a modified stator and in all other respects is identical to the sensor of the third embodiment. As shown in FIG. 15, stator elements 502 and 504 are relatively thin members constructed from a high magnetic permeability material having slots 506. Teeth (not shown) are located intermediate the slots. Plastic overmolds 508 and 510 are molded and secured to the stator elements by injection molding with the stator elements 502 and 504 incorporated in an injection molding die as inserts. Stator 504 has a flange portion which acts in conjunction with a flange portion formed integral to overmold 510 to define a cavity for receiving wire coil 500. Retainer 514 acts in conjunction with annular magnetic flux conductor 516 to maintain stator 502 and 504 in magnetic communication with one another. A toroidal magnetic flux path is established around the coil 500 proceeding from one pole face of magnet 414 passing through the teeth of the stator element 502 radially through the stator element, axially through the retainer 514 into the annular conductor 516, radially through the annular conductor into the stator element 504, radially through the stator to the stator teeth and finally to the opposite pole face of magnet 414. All other components of the variation to the third embodiment are identical and retain identical numbers as previously described.

Figure 16:
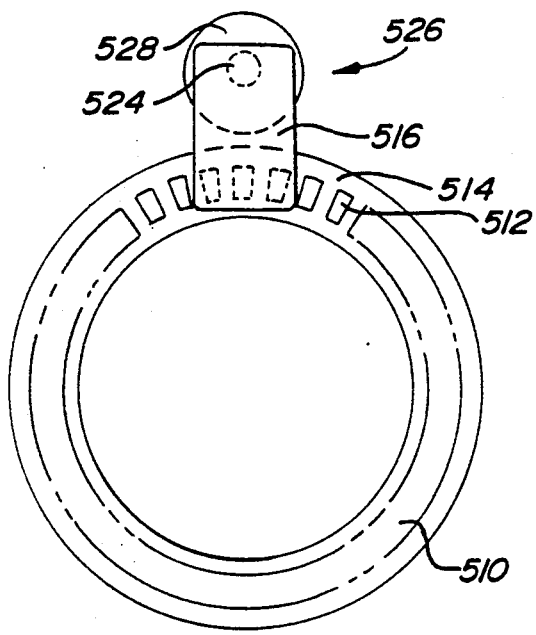
FIG. 16 is a side view of the sensor of the fourth embodiment.
Figure 17:
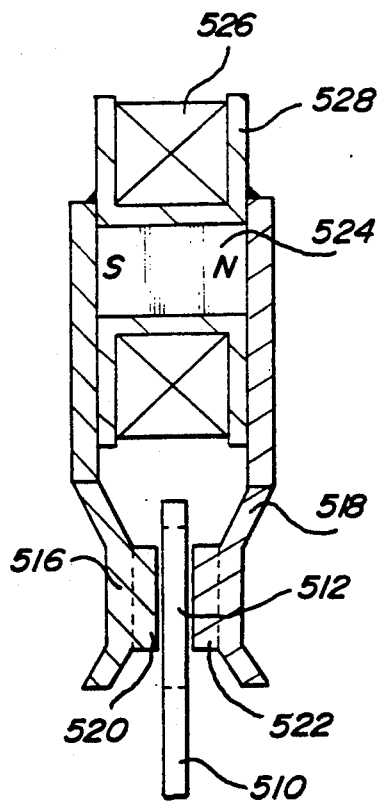
FIG. 17 is a sectional view of the sensor according to the fourth embodiment.

A fourth embodiment of the present invention is illustrated in side view in FIG. 16 featuring a rotor 510 having slots 512 which define teeth 514 therebetween. The rotor 510 engages a rotating shaft (not shown) as described in previous embodiments. Stator poles 516 and 518, as shown in FIG. 17, straddle the rotor 510 in a caliper-like fashion. Ferromagnetic teeth means 520 and 522 disposed on respective pole faces of stator poles 516 and 518 interact with slots 512 and teeth 514 to define a variable reluctance path for magnetic flux supplied by magnet 524. As described in previous embodiments, any technique for creating discontinuities in magnetic permeability of the interacting portions of the rotor and stator elements would be appropriate. In addition, previously described rotor and stator combination, will perform in a manner similar to the rotor and stator combination described herein. Coil 526 contained in bobbin 528 encircles magnet 524 and produces a variable output voltage signal which corresponds in frequency to the change in magnetic flux passing through the flux path which begins with a first pole face of magnet 524, passes radially along stator pole 516, axially through teeth 520, a sector of rotor 510, and teeth 522; radially through stator pole 518 and back to a second opposing pole face of magnet 524. As rotor 510 rotates, the rotor and stator teeth move into and out of juxtaposition to alternately decrease and increase the magnetic reluctance of the magnetic path. The change in reluctance increases and decreases the magnetic flux in the magnetic path. This change in flux generates a voltage in coil 526 in accordance with known principles. The output voltage of the sensor will be an alternating voltage with an amplitude proportional to the speed of rotation, and a frequency equal to the speed of rotation times the number of teeth encountered in one revolution.

Figure 18:
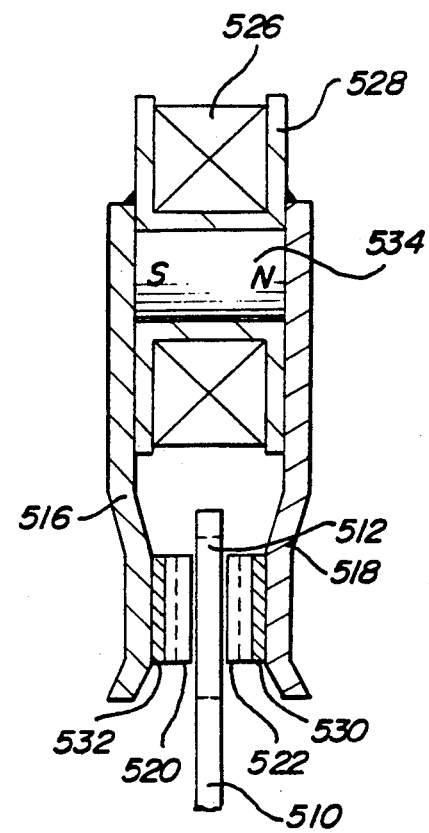
FIG. 18 is a sectional view of the sensor according to a modification of the fourth embodiment.

FIG. 18 illustrates an alternative of the fourth embodiment featuring stator elements 516 and 518 which straddle the rotor 510 in a caliper-like fashion. The stator elements comprise two axially spaced members having first portions including ferromagnetic teeth means 520 and 522 which provide alternating circumferentially spaced regions of first and second magnetic permeability.

Second portions of the stator elements forming stator poles 516 and 518 are axially spaced from the first and extend radially to a location outside the circumference of the rotor 510. Magnets 530 and 532 are affixed by suitable adhesive between, and thereby join, the first and second portions of the respective stator elements. A ferromagnetic cylinder 534 provides magnetic communication between the second portions of the stator elements.

The magnetic flux path now begins at respective pole faces of the magnets 530 and 532, passes through teeth means 520 and 522 and rotor 510, then radially through stator 516, axially through cylinder 534 and radially through stator 518. Variations in magnetic flux passing through the flux path as a result of rotation of rotor 510 causing teeth 514, 520 and 522 to alternate between aligned and non-aligned rotary positions produces a corresponding variation in voltage in coil 526. This variation in voltage corresponds to the rate of rotation of the rotor times the number of teeth encountered in one rotation. The form of the invention illustrated in FIGS. 17 and 18 permits the stator and coil section of the sensor to be removed and serviced without requiring additional disassembly.

Figure 19:
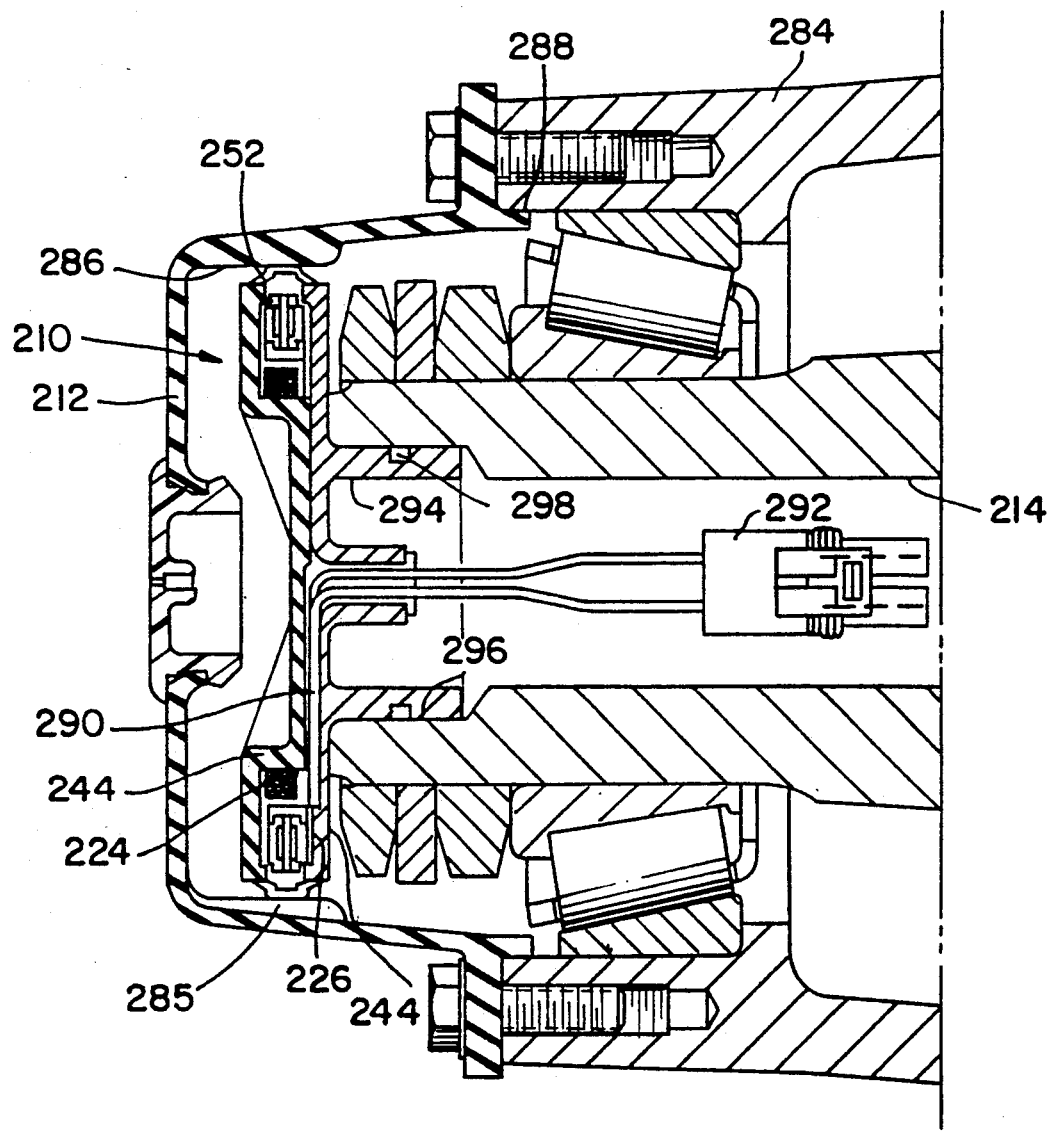
FIG. 19 is a view of the sensor mounted on a wheel spindle within a hubcap for measuring wheel speed.

FIG. 19 shows the speed sensor 210 of FIG. 7 applied to measure the speed of rotation of a non-driven wheel, as determined by measuring the rotational speed of wheel hub 284. Elastomeric ring 252 contacts hubcap 212 along its inside surface 286. Hubcap 212 is piloted on wheel hub 284 via flange portion 288 to assure that hubcap 212 is concentric with wheel spindle 214. As the wheel spindle 214 and hub 284 turn, hubcap 212 drives speed sensor 210.

Speed sensor 210 functions in essentially the same manner as the previously described sensors; however, the outer structural design of speed sensor 210 is modified to fit the particular exemplary plates molded into backing layers 244 in a fashion similar to that described with respect to FIG. 3. Channel 290 is formed in the backing material behind both stator elements 224 and 226 to provide a conduit for leads coming from coil 240 to connector 292, and therefrom to external processing circuitry. A sensor hub 294 formed from the backing material of the internal stator slideably engages counterbore 296 of spindle 214. An O-ring 298 seals counterbore 296.

Hubcap 212 seals the hub end and retains the bearing lubricant. Hubcap 212 is preferably an injection molding of a clear plastic to allow easy visual inspection of lubricant level. Channels 285 are provided in hubcap 212 to allow lubricant to flow from the spindle side of sensor 210 to the hubcap side.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:
1. A rotational speed sensor, comprising:
   a stator including two coaxial, axially spaced elements;
   said elements having first and second radially extending
   said first radial portions having alternating circumferentially spaced regions offering first and second magnitudes of magnetic permeability;
   a rotor arranged for rotation about a rotational axis and having alternating circumferentially spaced regions offering first and second magnitudes of magnetic permeability;
   said alternating cicumferentially spaced regions of first and second magnitudes of magnetic permeability of said rotor and said stator elements being arranged in axially opposed relationship and in close proximity;
   magnet disposed between said stator elements;
   said rotor, magnet and stator elements being arranged to form a flux path whereby a variation in a magnetic flux indicative of the rotational speed of said rotor relative to said stator is produced in said magnetic flux path upon rotation of said rotor;
   means for sensing variations in flux in said flux path; and
   said rotor comiprses two coaxial halves, said magnet is disposed between said rotor halves and each said stator element is connected by retainer means which provides a flux path therebetween.
2. A rotational speed sensor as claimed in claim 1, wherein said means for sensing variation in flux is a coil.
3. A rotational speed sensor as claimed in claim 1, wherein said magnet is radially spaced with respect to said rotor.
4. A rotational speed sensor as claimed in claim 3, further comprising a nonferromagnetic spacer means arranged to prevent shunting of a magnetic flux path away from said magnet.
5. A rotational speed sensor as claimed in claim 2 wherein said rotor nests within said coil whereby said rotor may be rotated by a centrally located driving element while the coil and stator are maintained nonrotating in a radially outward region.

6. A rotational speed sensor as claimed in claim 2 wherein said coil nests within said rotor whereby said rotor may be rotated by an outer annular driving element while the coil and stator are maintained nonrotating in a central region.

7. A rotational speed sensor as claimed in claim 1 wherein said alternating circumferentially spaced regions offering first and second magnitudes of magnetic permeability include ferromagnetic teeth means disposed on said first radial portions of said stator elements and said first and second axially spaced radially extending surfaces of said rotor.

8. A rotational speed sensor as claimed in claim 1 wherein said alternating circumferentially spaced regions offering first and second magnitudes of magnetic permeability comprise openings formed in said stator and said rotor.

9. A rotational speed sensor as claimed in claim 8 further comprising a nonferromagnetic component at least filling the spaces between the teeth means on the opposing surfaces of said stator and rotor but not covering the teeth means, whereby magnetic flux traversing the stator and rotor teeth means during operation of the sensor is not altered by the nonferromagnetic component and said opposing radial surfaces of said rotor and stator are relatively flat in profile.

10. A rotational speed sensor as claimed in claim 2 comprising retainer means arranged to retain said stator, coil, rotor and magnet in a unitized assembly.

11. A rotational speed sensor as claimed in claim 1, further comprising resilient seal means associated with said sensor providing an integral assembly and arranged to prevent passage of contaminants from at least one direction.

12. A rotational speed sensor as claimed in claim 1 wherein said sensor includes friction drive means.

13. A rotational speed sensor as claimed in claim 12, wherein said friction drive means comprises a resilient element engaging a driving member.

14. A rotational speed sensor as claimed in claim 13 wherein said resilient element has an aperture and said aperture is arranged to engage a tang drive means disposed on said drive member.

15. A rotational speed sensor as claimed in claim 1 further comprising;
means for providing a friction drive for said rotor; and
seal means for preventing entry of contaminants into said sensor.

16. A rotational speed sensor as claimed in claim 15 wherein both said friction drive means and said seal means comprise a unitary resilient seal and drive element.

17. A rotational speed sensor as claimed in claim 16, wherein said rotor is annular and includes diametrical inner and outer surfaces, and wherein said seal and drive element extends along one said surface of said rotor and is in sealing association with said stator.

18. A rotational speed sensor as claimed in claim 1, including spacer means arranged to maintain axial spacing between said rotor and stator teeth means.

19. A rotational speed sensor comprising;
a stator including two coaxial, axially spaced elements, each said stator having axially opposed first and second radially extending surfaces, each first radially extending surface having circumferentially spaced ferromagnetic teeth means disposed thereon,
a coil of wire disposed between said stator elements and coaxial therewith;
a rotor having axially spaced halves;
said rotor halves each having first and second axially spaced radially extending surfaces including circumferentially spaced ferromagnetic teeth means disposed on said surfaces;
a magnet disposed between said rotor halves;
a retainer means providing a flux path between each of said stator elements;
said rotor halves, coil and magnet being coaxially nested between said stator elements with said teeth means of each of said stator elements being arranged in axially opposed relationship and in close proximity to the teeth means of a respective adjacent rotor surface; and
said magnet, retainer, rotor halves and stator elements arranged to form a magnetic flux path about said coil whereby an electric current indicative of the speed of said rotor relative to said stator is induced in said coil upon rotation of said rotor due to periodic variation of said flux path at said teeth means.

20. A rotational speed sensor as claimed in claim 19 wherein said rotor nests within said coil whereby said rotor may be rotated by a centrally located driving element while the coil and stator are maintained nonrotating in a radially outward region.

21. A rotational speed sensor as claimed in claim 19 wherein said coil nests within said rotor whereby said rotor may be rotated by an outer annular driving element while the coil and stator are maintained nonrotating in a central region.

22. A rotational speed sensor as claimed in claim 19 wherein said circumferentially spaced ferromagnetic teeth means comprises structure extending from the surface of said rotor and said stators.

23. A rotational speed sensor as claimed in claim 19 wherein said circumferentially spaced ferromagnetic teeth means comprises openings formed in said stator and said rotor.

24. A rotational speed sensor as claimed in claim 19 further comprising a nonferromagnetic component at least filling the spaces between the teeth means on the opposing surfaces of the stator and rotor.

25. A rotational speed sensor as claimed in claim 19, further comprising resilient seal means associated with said sensor and arranged to prevent passage of contaminants from at least one direction.

26. A rotational speed sensor as claimed in claim 19 wherein said sensor includes friction drive means.

27. A rotational speed sensor as claimed in claim 26, wherein said friction drive means comprises a resilient element engaging a driving member.

28. A rotational speed sensor as claimed in claim 27 wherein said resilient element has an aperture and said aperture is arranged to engage a tang drive means disposed on said drive member.

29. A rotational speed sensor as claimed in claim 19 further comprising;
means for providing a friction drive for said rotor; and
seal means for preventing entry of contaminants into said sensor.

30. A rotational speed sensor as claimed in claim 29 wherein both said friction drive means and said seal means comprise a unitary resilient seal and drive element.

31. A rotational speed sensor as claimed in claim 30, wherein said rotor is annular and includes diametrical inner and outer edge surfaces, and wherein said seal and drive elements extends along one said edge surface of said rotor and is in sealing association with said stator.

32. A rotational speed sensor as claimed in claim 19 including spacer means arranged to maintain axial spacing between said rotor and stator teeth means.

33. An electrical rotational speed sensor including a nonrotatable spindle terminating at an end area; a rotatable hub mounted on the spindle; a hub cap disposed adjacent the spindle end area and connected to the hub for rotation therewith; a rotor element connected to said hub cap for rotation therewith; a stator element connected to said spindle; means for generating an electrical signal indicative of the speed of rotation of said rotor relative to said stator; said stator comprising two coaxial, axially spaced elements, each said stator having axially opposed first and second radially extending surfaces, each first radially extending surface having circumferentially spaced ferromagnetic teeth means disposed thereon, a rotor having axially spaced halves;

said rotor halves each having first and second axially spaced radially extending surfaces including circumferentially spaced ferromagnetic teeth means disposed on said surfaces;

a magnetic disposed between said rotor halves;

a retainer means providing a flux path between each of said stator elements;

said rotor halves, coil and magnet being coaxially nested between said stator elements;

said means for generating said electrical signal comprising a wire coil disposed between and coaxial with said stator elements;

said rotor halves, magnet and coil being coaxially rested between said stator elements with the teeth means of each of said stator elements being in close axially spaced proximity to the teeth means of the rotor element and with said coil nonrotatable connected to said spindle; and said magnet, retainer, rotor halves, and teeth means arranged to provide a magnetic flux path whereby upon rotation of said hub relative to said spindle, said electrical signal is generated indicative of the speed of rotation of the hub relative to the spindle due to the periodic variance of magnetic flux across opposed teeth.

34. A rotational speed sensor comprising;

a stator including two coaxial, axially spaced elements;

said elements having first and second radial portions;

said first radial portion having alternating circumferentially spaced regions offering first and second magnitudes of magnetic permeability;

said stator elements being in magnetic communication with one another;

a low magnetic permeable rotor arranged for rotation about an axis;

said rotor having a plurality of circumferentially spaced magnetic flux sources disposed thereon;

said flux sources on said rotor and said circumferentially spaced regions on said stator being arranged in axially opposed relationship to complete a magnetic flux path formed by said stator;

said magnetic flux sources arranged to produce a variable magnetic flux in said flux path as said circumferentially spaced regions on said stator alternate between aligned and non-aligned axially opposed positions with said magnetic flux sources;

a wire coil disposed proximate said magnetic flux path in such a manner that said rotor and said coil are coaxially nested between said stator elements; and a retainer means arranged to retain said stator, coil and rotor in a single assembly.

35. A rotational speed sensor as claimed in claim 34 wherein said coil is axially spaced from said rotor whereby said coil and said rotor provide a minimal radial package size.

36. A rotational speed sensor as claimed in claim 34 wherein said coil is radially spaced from said rotor whereby said coil and said rotor provide a minimal axial package size.

37. A rotational speed sensor as claimed in claim 34 wherein said alternating circumferentially spaced regions of said stator are provided by openings formed in said stator elements and wherein said stator elements are formed of high magnetic permeability material.

38. A rotational speed sensor as claimed in claim 37 wherein said openings are filled with a low magnetic permeability material whereby the surfaces of said stator elements are relatively flat in profile.

39. A rotational speed sensor as claimed in claim 34 wherein said alternating circumferentially spaced regions of said stator are provided by circumferentially spaced teeth means disposed thereon and said teeth are in axial opposition and close proximity to said magnetic flux sources of said rotor.

40. A rotational speed sensor as claimed in claim 34 wherein said stator further comprises low magnetic permeability portions at least partially filling the spaces between the teeth whereby said stator offers a relatively flat profile.

41. A rotational speed sensor as claimed in claim 34, further comprising resilient seal means associated with said sensor and arranged to prevent passage of fluid or contaminants from at least one direction.

42. A rotational speed sensor as in claim 34 wherein said rotor is driven by a friction drive means including a resilient element affixed to said rotor and compliantly engaging a driving member.

43. A rotational speed sensor as claimed in claim 34 further comprising means for providing a friction drive for said rotor and seal means for preventing passage of fluid or contaminants.

44. A rotational speed sensor as in claim 43, wherein said friction drive means and said seal means comprise a unitary seal and drive element.

45. A rotational speed sensor as claimed in claim 44, wherein said rotor is annular and includes diametrical inner and outer edge surfaces, and wherein said unitary seal and drive element extends along said inner edge surface of said rotor and is in sealing association with at least one of said stator elements.

46. A rotational speed sensor as claimed in claim 42 wherein said resilient element has an aperture and said aperture is arranged to engage a tang drive means disposed on said drive member.

47. A rotational speed sensor, comprising;

a stator including two coaxial, axially spaced elements;

each said stator element having axially opposed inner and outer radially extending surfaces, each inner radially extending surface having circumferentially spaced teeth means disposed thereon and each stator being in magnetic communication with one another;

a wire coil disposed between said stator elements and coaxial therewith;

a rotor arranged for rotation about a rotational axis and having first and second axially spaced radially extending surfaces including a plurality of circumferentially spaced passageways defining an opening on said first surface and a corresponding second opening on said second surface;

a magnetic flux means disposed in each of said passageways having a first pole adjacent said first opening and a second pole adjacent said second opening;

said rotor and said coil being coaxially nested between said stator elements;

said magnetic flux means disposed in said passageway and said teeth means of said stator being arranged in axially opposed relationship and in close proximity;

said magnetic flux means, and said stator being arranged to form a magnetic flux path whereby an electrical current indicative of the rotational speed of said rotor relative to said stator is induced in said coil upon rotation of said rotor due to periodic variation of said flux path as said magnetic flux means and said teeth means alternate between aligned and non-aligned axially opposed positions; and a retainer means arranged to retain said stator, coil and rotor in a single assembly and provide magnetic communication between each of said stator elements.

48. A rotational speed sensor as claimed in claim 47 wherein said stator further comprises a low magnetic permeability portion at least partially filling the spaces between the teeth whereby said stator offers a relatively flat profile.

49. A rotational speed sensor as claimed in claim 47, further comprising resilient seal means associated with said sensor and arranged to prevent passage of fluid or contaminants from at least one direction.

50. A rotational speed sensor as claimed in claim 47 further comprising means for providing a friction drive for said rotor and seal means providing an integral assembly for preventing passage of fluid or contaminants.

51. A rotational speed sensor as in claim 50, wherein said friction drive means and said seal means comprise a unitary seal and drive element.

52. A rotational speed sensor as claimed in claim 51, wherein said rotor is annular and includes diametrical inner and outer edge surfaces, and wherein said unitary seal and drive element extends along said inner edge surface of said rotor and is in sealing association with at least one of said stator elements.

53. A rotational speed sensor as claimed in claim 47 wherein said passageway has a radial dimension intermediate said first and second opening which is smaller than either radial dimension of said first and second opening wherein said smaller radial dimension acts to form a mechanical interlock retaining said magnetic flux means in said passageway.

* * * * *